April 25, 1967   C. L. DAILEY ET AL   3,315,471
DIRECT CYCLE RADIOISOTOPE ROCKET ENGINE
Original Filed Dec. 7, 1962   3 Sheets-Sheet 1
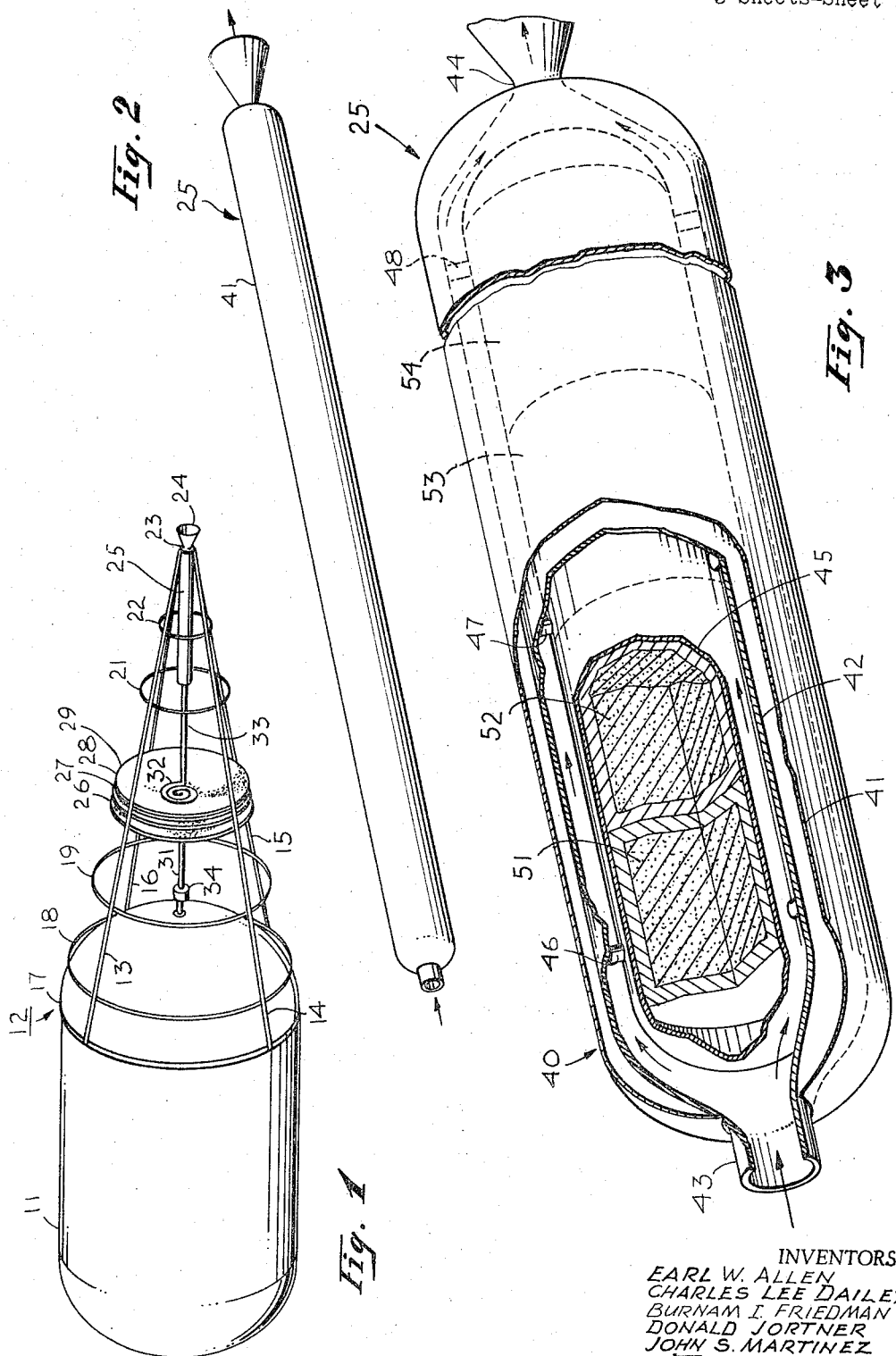
INVENTORS
EARL W. ALLEN
CHARLES LEE DAILEY
BURNAM I. FRIEDMAN
DONALD JORTNER
JOHN S. MARTINEZ
BY E. Hayward Marshall
AGENT

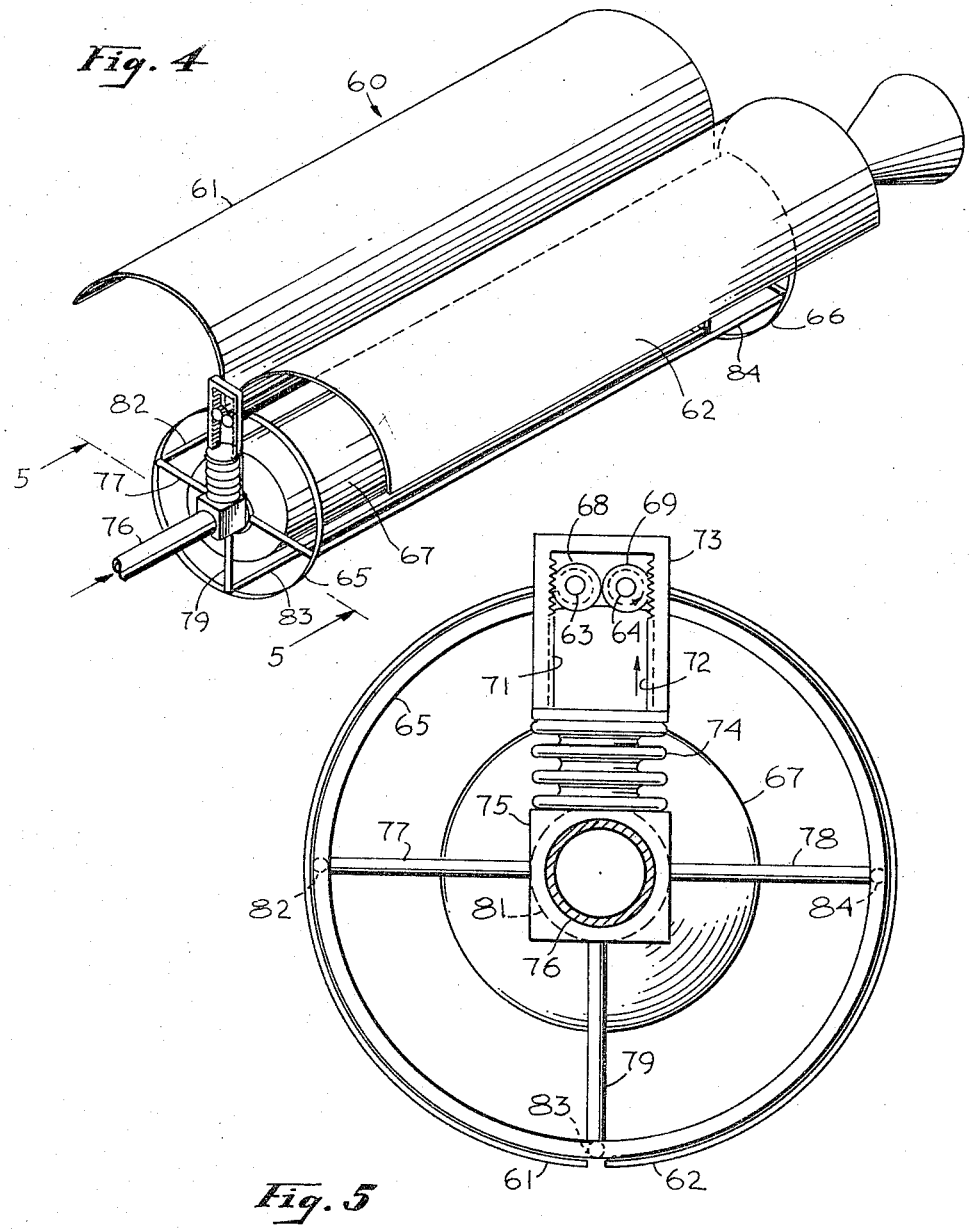

April 25, 1967 C. L. DAILEY ETAL 3,315,471
DIRECT CYCLE RADIOISOTOPE ROCKET ENGINE
Original Filed Dec. 7, 1962 3 Sheets-Sheet 3
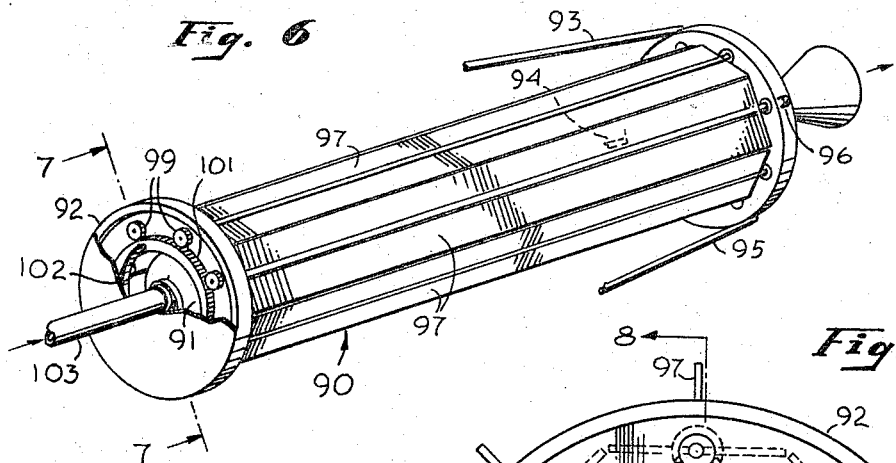
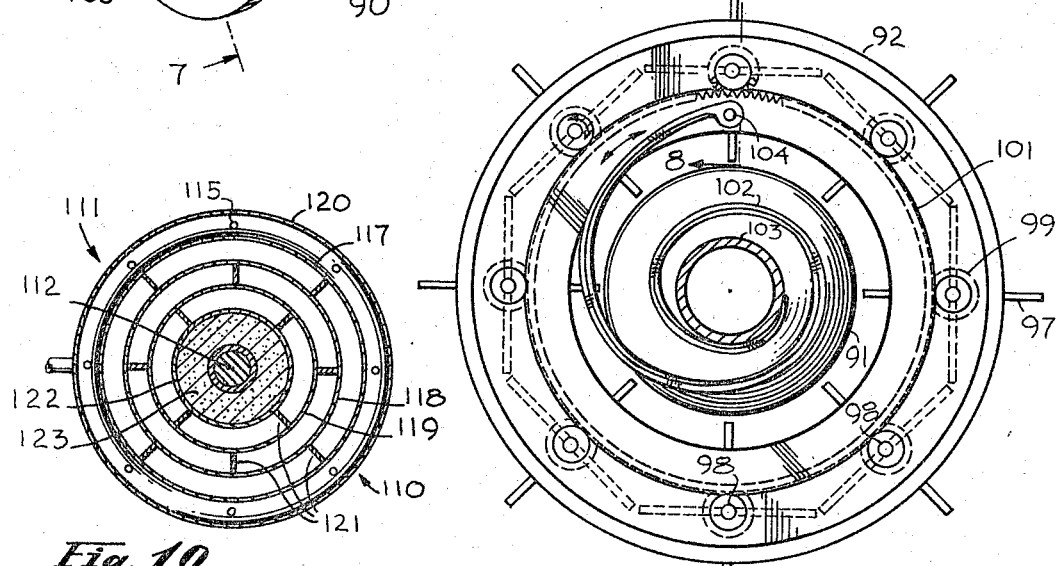
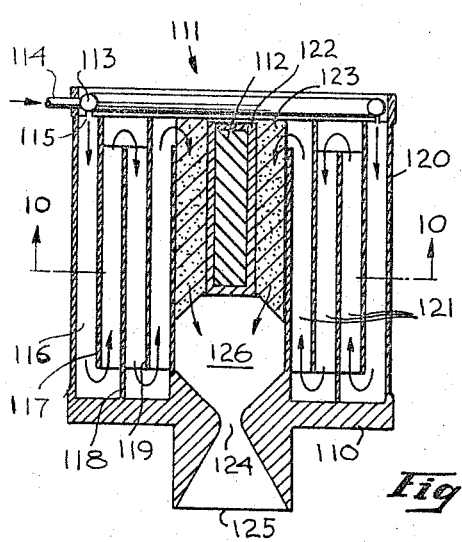
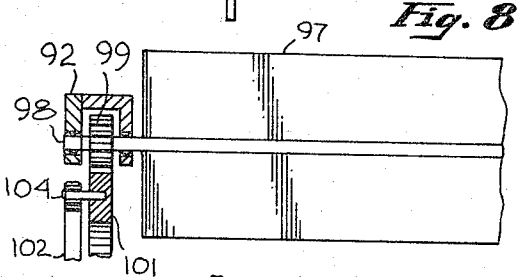
EARL W. ALLEN
CHARLES LEE DAILEY
BURNAM I. FRIEDMAN
DONALD JORTNER
JOHN S. MARTINEZ
INVENTORS
BY
E. Hayward Marshall
AGENT United States Patent Office 3,315,471
Patented Apr. 25, 1967

3,315,471
DIRECT CYCLE RADIOISOTOPE ROCKET ENGINE
Charles Lee Dailey, Palos Verdes Estates, Burnam I. Friedman, San Pedro, John S. Martinez, Torrance, Earl W. Allen, Malibu, and Donald Jortner, Palos Verdes Peninsula, Calif., assignors, by mesne assignments, to TRW Inc., a corporation of Ohio
Continuation of application Ser. No. 243,140, Dec. 7, 1962. This application Oct. 6, 1965, Ser. No. 505,090
9 Claims. (Cl. 60—203)

This invention relates to a heated gas rocket engine or thrustor for space vehicles and more particularly to a direct cycle low thrust rocket engine which employs an encapsulated radioisotope to heat a working fluid to an elevated temperature and then expels the hot gas through a nozzle to provide a high specific impulse with a low specific weight for the propulsion system. This is a continuation of application Ser. No. 243,140, filed Dec. 7, 1962, now abandoned.

The majority of rocket propulsion systems in current use utilize chemical energy to provide the heat for the working fluid. These systems are characterized by relatively low thrustor specific weights of approximately 0.02 lb. m./lb. f., but have a maximum potential specific impulse of approximately 450 lb. f.-sec./lb. m. which is relatively low. Various high specific impulse electric propulsion systems are currently being developed, including arc jets, plasma jets and ion engines. While these systems have very high specific impulse from 1,000 to 10,000 lb. f.-sec./lb. m., the total weight of the power supply and engine is relatively high resulting in specific weights of more than 2,000 lb. m./lb. f. It is quite obvious that neither the chemical or electrical propulsion systems can simultaneously provide both high specific impulse and low propulsion system weight.

Briefly stated, one preferred embodiment of a radioisotope rocket engine of the present invention provides a relatively high specific impulse of 700 to 800 lb. f.-sec./lb. m. or higher with a relatively low specific thrustor weight of approximately 20 to 50 lb. m./lb. f. and consists essentially of one or more encapsulated radioisotope heat sources located in the geometric center of the rocket engine and surrounded by a cylindrical housing forming an annular flow channel or fluid passage around the capsule. One end of the cylindrical housing is connected to a propellant line extending from a propellant storage tank which is preferably filled with a working fluid, such as hydrogen (H$_2$), or other suitable propellants, such as N$_2$H$_4$, NH$_3$ and H$_2$O. The working fluid in the storage tank preferably receives sufficient heat to generate vapor pressure within the storage tank which is sufficient to force the fluid out of the tank and through the annular fluid passage, where heat is transferred to the fluid by conduction through the walls of the capsule and thence by convection and radiation to the gas which is formed by vaporization of the working fluid at the entrance end of the thrustor. This gas is superheated to higher and higher temperatures as it flows through the engine and out of a nozzle formed at the opposite end of the housing. An external radiation shield is preferably provided in spaced relation around the housing in order to maintain the desired operating temperature within the engine during maximum flow of the working fluid. An optimum safe operating temperature during throttled or no flow conditions may be maintained by passive temperature control utilizing thermal radiation from the outer radiation shield which is immovable with respect to the heat source or by active temperature control utilizing suitable means for operating a clam shell or louvered type of radiation shield which when open permits radiation directly from the housing.

With passive temperature control it may be necessary to operate the system with a continuous flow of propellant for cooling, and also ground cooling on the launch pad, with possible burnup after usage. Alternatively the thrustor must be operated at a temperature lower than the maximum temperature possible during flow or with active temperature control.

A plurality of simple light weight heat shields are preferably provided between the propellant tank and the thrustor for reducing the heat transfer to the tank, and the efficiency of these heat shields may be increased by passing the main propellant line over the hottest shield which is closest to the thrustor. This also preheats the working fluid and thus increases the thermal efficiency of the rocket engine by increasing the inlet temperature of the working fluid, such as hydrogen. Preheating of the hydrogen or other propellant and an increase in thermal efficiency of the thrustor may be obtained by using a multipass system, wherein the radioisotope capsule is surrounded by a plurality of annular baffles or concentric shells, which preheat and vaporize the propellant and also reduce the heat transfer from the radioisotope heat source by radiation.

One object of the present invention is to provide a direct cycle, low thrust, radioisotope heated, gas rocket engine having a high specific impulse and a low specific weight which is particularly adapted for certain orbital transfer functions, such as launching light weight satellites from a low parking orbit to a higher orbit, for example, in the launching of 24 hour communication satellites from low earth orbits to synchronous orbit.

Another object of the present invention is to provide a rocket engine which is extremely reliable, since it requires no external power supply and therefore has no moving parts or high voltage components which may be subject to failure.

A further object of the present invention is to provide a rocket engine which has a completely stable operating mode over a wide range of thrust and specific impulse from zero flow rate to a maximum flow rate, and also provides a more rapid response characteristic than other systems having a comparable specific impulse.

Still another object of the present invention is to provide a radioisotope direct cycle rocket engine with thermal and fluid flow control which has the flexibility to operate over a wide range of thrust and with either intermittent or continuous flow of propellant, and utilizing either passive or active thermal control for maintaining the integrity of the system, so that it will not be self destructive during no flow conditions, but will provide sufficient heat and operate efficiently upon demand.

A still further object of the present invention is to provide a low thrust rocket engine which utilizes an encapsulated radioisotope such as ceric oxide (Ce$^{144}$O$_2$) in a tungsten capsule and is adapted to operate at extremely high temperatures.

Other objects and many of the attendant advantages of this invention will be readily appreciated as the same becomes better understood by reference to the following detailed description when considered in connection with the accompanying drawings wherein:

FIG. 1 is a pictorial view illustrating one preferred embodiment of a propulsion system incorporating the present invention;

FIG. 2 is an enlarged pictorial view illustrating one preferred embodiment of the thrustor of the present invention utilizing passive temperature control;

FIG. 3 is a pictorial view with a portion broken away and illustrating the internal construction of the thrustor of FIG. 2 on an enlarged scale;

FIG. 4 is a pictorial view illustrating one modification of the thrustor of the present invention utilizing a clam shell type of radiation shield for active temperature control;

FIG. 5 is a transverse sectional view taken on the line 5—5 of FIG. 4 and showing the operating mechanism for opening and closing the radiation shields on an enlarged scale;

FIG. 6 is a pictorial view illustrating another modification of the present invention with a louvered type of radiation shield for active temperature control of the rocket engine;

FIG. 7 is a transverse sectional view on an enlarged scale taken on the line 7—7 of FIG. 6 and illustrating one type of mechanism which can be employed for opening and closing the louvers on the radiation shield;

FIG. 8 is a detailed fragmentary sectional view taken on the line 8—8 of FIG. 7;

FIG. 9 is a longitudinal sectional view illustrating another modification of the present invention utilizing a multiple pass heat exchanger in conjunction with a radioisotope heat source for providing a higher efficiency with passive temperature control; and FIG. 10 is a transverse sectional view taken on the line 10—10 of FIG. 9.

Referring now to the drawings in detail and more particularly to FIG. 1 illustrating one preferred embodiment of a propulsion system incorporating the heated propellant thrustor of the present invention, the propellant tank 11 is filled with a suitable propellant such as liquid hydrogen ($H_2$) or other suitable propellant such as ammonia ($NH_3$), hydrazine ($N_2H_4$) or water ($H_2O$).

A suitable framework or engine support structure 12 is suitably mounted on the propellant tank 11 and consists of a plurality of struts 13, 14, 15 and 16 connected to a plurality of rings or hoops 17, 18, 19, 21 and 22 which are interconnected to form a strong supporting structure extending out to a collar 23 surrounding the throat of the nozzle 24 on the thrustor 25. The framework 12 also serves to mount a plurality of heat radiation shields 26, 27, 28 and 29 which are mounted intermediate to the propellant tank 11 and thrustor 25 to reduce the propellant tank heating to an acceptable level by completely hiding the tank from the thrustor 25.

The efficiency of these heat shields can be increased by passing the main propellant line 31 which is connected to the propellant tank 11 over the hottest shield 29 in the form of a spiral or helical coil as shown at 32. The other portion 33 of the propellant line 31 extending from the coil 32 is connected to the inlet end of thrustor 25.

If desired, suitable insulation and means for pressure control (not shown) may be provided on the propellant tank 11. A flow control valve 34 may be inserted in the propellant line 31 for varying or shutting off the flow of propellant to the thrustor 25, and may be controlled by a solenoid, fluid actuator or other suitable means (not shown). However, in some applications a continuous flow of propellant may be desirable, in which case only a simple on-off valve may be used.

The thrustor 25 of FIG. 1 is shown in more detail in the enlarged views of FIGS. 2 and 3 with FIG. 3 being partially broken away to illustrate the internal construction of the thrustor. In this modification, the thrustor 25 utilizes a housing 40 with passive temperature control which would require a continuous flow of propellant or a design providing sufficient radiation from the outer radiation shield 41 to maintain the internal temperature at a safe level.

As shown in FIG. 3 the outer radiation shield 41 is concentric with an outer shell 42 to provide an annular space therebetween. The outer shell 42 is tapered at the inlet end to a sleeve 43 which is connected to the propellant inlet line 33 (shown in FIG. 1), and the opposite end is tapered to the throat 44 of the nozzle 24 integrally formed on the shell 42.

An inner shell 45 is mounted in concentric spaced relation to the outer shell 42 by a plurality of spacers such as those shown at 46, 47 and 48 to provide an annular flow channel or fluid passage for the propellant flowing through the thrustor 25. It may be desirable to form a spiral fluid passage by providing a helical spacer (not shown) between shells 42 and 45. The inner shell 45 encloses a plurality of capsules such as those shown at 51, 52, 53 and 54 containing a radioisotope such as ceric oxide ($Ce^{144}O_2$), or alternatively, curium (Cm–242 or Cm–244), or plutonium (Pu–238), or compounds of each (e.g. carbides, etc.), depending upon the particular power requirements and lifetime of the space vehicle.

For certain applications and particular missions where it is desirable to have a maximum thrust and operate the thrustor at the maximum permissible temperature for optimum efficiency it will be desirable to provide a housing with active temperature control, particularly where the demands for thrust are intermittent or variable, and the temperatures, especially during no flow conditions, might reach dangerous levels with the outer radiation shield 41 of FIGS. 1, 2 and 3 enclosing the thrustor 25. Therefore, a movable outer radiation shield may be provided which would be opened and closed as required by the operating conditions.

One modification utilizing a housing 60 with a clam shell type radiation shield for active temperature control is illustrated in FIGS. 4 and 5, wherein the two halves or sections of the clam shell radiation shield 61 and 62 are in the shape of cylindrical segments which are pivotally mounted on the shafts 63 and 64 in suitable bearings on the mounting rings 65 and 66. At one end of the thrustor 67, preferably near the inlet end, a pair of pinion gears 68 and 69 are mounted on the shafts 63 and 64 and are actuated by the racks 71 and 72 formed on the inner edges of the rectangular frame 73.

The frame 73 is rigidly connected to one end of an expandable bellows 74 which is mounted on a collar 75 extending around the propellant inlet line 76 adjacent and preferably in contact with the inlet end of the thrustor 67. If desired, however, the average operating temperature of the expandable bellows 74 can be set by adjusting the location of the bellows relative to both the thrustor and the propellant tank.

The rings 65 and 66 have a plurality of radial arms such as those shown at 77, 78 and 79 in FIG. 5 which are connected to the ring 81 and also to the struts 82, 83 and 84 of the framework or engine support structure, similar to that shown in FIG. 1.

The expansible bellows 74 provides a thermostatic actuator for movement of the frame 73 and racks 71 and 72 to rotate the pinions 68 and 69, thus opening and closing the two halves of the clam shell radiation shields 61 and 62 in response to the variation in temperature at the inlet end of the thrustor. Since the flow of propellant, such as hydrogen, through the inlet line 76 will maintain the inlet end of the thrustor at a relatively low temperature during maximum flow conditions, during low flow or zero flow conditions this end of the thrustor will heat up to a relatively high temperature, thus expanding the bellows 74 and opening the two halves of the radiation shields 61 and 62 to permit radiation of heat directly from the outer wall of the thrustor 67 which will maintain the internal temperatures at a reasonable and safe level.

If desired, a solenoid or fluid actuator (not shown) operated in conjunction with the flow control valve 34, may be used in place of the bellows 74 to operate the moveable sections of the radiation shield for active temperature control.

Another modification of the present invention having a housing 90 with a louvered type of radiation shield for active temperature control of the thrustor 91 is illustrated in FIGS. 6 and 7 and consists of an annular channel 92 connected to the struts 93, 94, 95 and 96 which would extend from the supporting framework attached to the propellant tank, as in FIG. 1.

A plurality of louvers or sections 97 are mounted on shafts 98 and are rotated through a plurality of pinion gears 99 mounted on their respective shafts 98 and in engagement with a ring gear 101.

The ring gear 101 may be rotated by any suitable means, such as the bimetallic thermostatic actuator 102, which is rigidly connected to the inlet line 103 in juxtaposition to the inlet end of the thrustor 91. The opposite end of the actuator 102 is connected to a pin 104 on the ring gear 101, whereby an increase in temperature during throttled or no flow conditions will rotate the ring gear in a counter-clockwise direction, thus moving the louvers 97 from the closed position of FIG. 6 to the open position as shown in FIG. 7. Flow of hydrogen or other propellant through the inlet line 103 and the inlet end of the thrustor 91 will lower the temperature of the bimetallic element 102 thus actuating the ring gear in a clockwise direction to close the louvers.

The mean operating temperature of the temperature regulating actuator 102 can be adjusted by varying the location relative to the thrustor 91 and the propellant tank 11 (FIG. 1).

A detailed enlarged view of the channel section 92 with pinion gear 99 and ring gear 101 connected to the actuator 102 by the pin 104 is illustrated in FIG. 8.

Another modification of the present invention is illustrated in FIGS. 9 and 10, wherein a housing 110 forming a multiple pass heat exchanger 111 is utilized in conjunction with a radioisotope heat source 112 for providing a higher thermal efficiency with passive temperature control.

In this form of the invention the propellant such as hydrogen, enters an annular manifold 113 in housing 110 through the inlet line 114 and is injected through a plurality of orifices 115 into the outer pass 116 of the heat exchanger 111.

A plurality of cylindrical baffles 117, 118 and 119 are spaced in concentric relation within the outer wall 120 of housing 110 by a plurality of spacers 121 to form a fluid passage with a tortuous path for the propellant fluid.

The radioisotope heat source 112 in this form of the invention is preferably mounted in a capsule 122 which is positioned within a porous tungsten cylinder 123 through which the propellant passes to the throat 124 of a nozzle 125. In this particular modification most of the heat is transferred to the propellant as it passes through the porous cylinder 123 into the rocket chamber 126, since this portion of the engine reaches a relatively high temperature. The outer wall 120 serves as an outer radiation shield which radiates heat into space, and the baffles 117, 118 and 119 form a plurality of radiation shields which retain most of the heat from the radioisotope source 112 to provide a maximum thrustor operating efficiency.

The structural elements of the thrustor and particularly the enclosures for the radioisotope capsules 52, the inner shell 45, the outer shell 42 and the heat radiation shield 41 are preferably formed of tungsten, or other suitable material having a relatively high melting point, well above the maximum temperatures that will be encountered during operation. The engine support structure or framework 12, or at least most of the elements thereof, may be formed of some lighter weight material such as aluminum, since they are not subjected to such extreme temperatures.

Additional concentrically spaced outer radiation shields, either fixed or moveable, may be added in order to raise the thermal efficiency of the thrustor. Obviously the propulsion system disclosed herein will require integration into the complete space vehicle system by suitable means (not shown) for connection to the payload and booster stages.

The specific design of any particular radioisotope rocket engine in accordance with the present invention will depend upon the particular space mission and will vary considerably accordingly. In one specific example for a thrustor, such as those shown in FIGS. 1 through 8, having a thrust of about ¼ pound, a mass flow rate of liquid hydrogen of approximately $3.125 \times 10^{-4}$ pounds per second, and utilizing $Ce^{144}O_2$ with a power density of approximately 20 watts per cc., the radioisotope capsule would have a diameter of approximately 1.4 inches and the thrustor length would be approximately 22 inches providing an outlet propellant temperature of 4100° R. With this particular design, typical maximum temperatures in degrees Rankine (° R.) during maximum flow at the exit end of the heat exchanger and during zero flow with the outer radiation shield closed and open are indicated in the following table:

|  | Maximum Temperatures | | |
| --- | --- | --- | --- |
|  | Maximum Flow—Outer Shell Closed | Zero Flow | |
|  |  | Shell Closed | Shell Open |
| Outer Radiation Shell | 2,900 | 2,950 | |
| Thrustor Housing | 3,900 | 3,950 | 3,150 |
| Propellant | 4,100 | | |
| Capsule (outer surface) | 4,300 | 4,650 | 4,080 |
| Center Line—$Ce^{144}O_2$ | 4,800 | 5,150 | 4,570 |

Since ceric oxide ($Ce^{144}O_2$) emits beta and gamma rays which are extremely hazardous for certain missions, it may be desirable to use other radioisotopes such as curium (Cm–242 or Cm–244) or plutonium (Pu–238) and compounds thereof which are alpha emitters, but may have power densities varying from 6 to 1170 watts per cc. and therefore the diameter of the radioisotope capsule would necessarily be made larger or smaller in order to provide the desired exit temperature for the propellant. The diameter of the radioisotope capsule must be selected to limit the center line temperature of the radioisotope to a reasonable and safe temperature below the melting point of the particular radioisotope utilized.

Obviously, many other modifications and variations of the present invention may be made within the scope of the following claims.

The embodiments of the invention in which an exclusive property or privilege is claimed are defined as follows:

1. A direct cycle, radioisotope-heated propellant, rocket engine comprising:
    a radioisotope heat source;
    a housing surrounding said heat source and providing a fluid passage therebetween for flow of propellant over said heat source, said housing defining a propellant inlet at one end of said passage and a propellant outlet at the other end of said passage;
    a nozzle adapted to receive the heated propellant from the outlet end of said fluid passage;
    passive thermal radiation means for radiating heat from said radioisotope heat source to reach thermal equilibrium with said heat source and said housing thus preventing destructive overheating of the engine under conditions of no propellant flow through said housing and under conditions of propellant flow through said housing, and during all heat emission rates up to and including the maximum emission from said heat source.

2. A direct cycle, radioisotope-heated propellant, rocket engine comprising:
    a radioisotope heat source;
    a housing surrounding said heat source and providing a fluid passage for flow of propellant over said heat source, said housing defining a propellant inlet at one end of said passage and a propellant outlet at the other end of said passage;
    a nozzle adapted to receive the heated propellant from the outlet end of said fluid passage;

means defining passive thermal radiation means for radiating heat from said radioisotope heat source and located so as to allow the flow of propellant between said passive thermal radiation means and said heat source so that under propellant flow conditions a portion of the heat from said radioisotope heat source is transferred to said propellant and under conditions of no flow of propellant all of said heat is transferred to said radiation means, said passive thermal radiation means being capable of dissipating the heat from said radioisotope heat source and thus continuously preventing destructive overheating of the engine under conditions of flow or no flow of propellant, and during all heat emission rates from said heat source up to and including the maximum heat emission rate.

3. A direct cycle, radioisotope-heated propellant, rocket engine comprising:
   an encapsulated radioisotope heat source;
   a housing surrounding said heat source in spaced relation thereto and providing a fluid passage for flow of propellant over said heat source;
   said housing having a propellant inlet at one end of said passage;
   said housing including an outer radiation shield comprising a plurality of sections movable from a closed to an open position and thermostatic means responsive to temperature changes within said housing for moving said sections to thereby maintain a predetermined operating temperature by permitting radiation directly from said housing;
   a nozzle adapted to receive the heated propellant from the outlet end of said fluid passage;
   a propellant tank having a propellant line connected to said inlet and a valve in said propellant line;
   a support structure extending between said tank and said housing, and
   a plurality of heat shields mounted on said support structure intermediate said tank and said housing.

4. A direct cycle, radioisotope-heated propellant, rocket engine comprising:
   an encapsulated radioisotope heat source;
   a housing surrounding said heat source in spaced relation thereto and providing a fluid passage for flow of propellant over said heat source;
   said housing having a propellant inlet at one end of said passage;
   said housing including an outer radiation shield comprising a plurality of louver sections movable from a closed to an open position including thermostatic means responsive to temperature changes within said housing for moving said sections to thereby maintain a predetermined operating temperature by permitting radiation directly from said housing;
   a nozzle adapted to receive the heated propellant from the outlet end of said fluid passage;
   a propellant tank having a propellant line connected to said inlet and a valve in said propellant line;
   a support structure extending between said tank and said housing, and
   a plurality of heat shields mounted on said support structure intermediate said tank and said housing.

5. A direct cycle, radioisotope-heated propellant, rocket engine comprising:
   an encapsulated radioisotope heat source;
   a housing surrounding said heat source in spaced relation thereto and providing a fluid passage for flow of propellant over said heat source;
   said housing having a propellant inlet at one end of said passage;
   said housing including an outer radiation shield comprising a plurality of clam shell sections movable from a closed to an open position and including thermostatic means responsive to temperature changes within said housing for moving said sections to thereby maintain a predetermined operating temperature by permitting radiation directly from said housing;
   a nozzle adapted to receive the heated propellant from the outlet end of said fluid passage;
   a propellant tank having a propellant line connected to said inlet and a valve in said propellant line;
   a support structure extending between said tank and said housing, and
   a plurality of heat shields mounted on said support structure intermediate said tank and said housing.

6. A direct cycle radioisotope-heated propellant, thrustor comprising:
   a radioisotope heat source;
   a housing surrounding said heat source in spaced relation thereto and providing an annular fluid passage for flow of propellant over said heat source;
   said housing having a propellant inlet to one end of said passage;
   said housing including an outer radiation shield;
   said radiation shield comprising a plurality of sections movable from a closed to an open position and means responsive to the temperature within said housing for moving said sections to thereby control the temperature rise of the thrustor by permitting radiation directly from the inner portion of said housing adjacent said heat source; and
   a nozzle receiving the heated propellant from the outlet end of said passage.

7. A direct cycle radioisotope-heated propellant, thrustor comprising:
   a radioisotope heat source;
   a housing surrounding said heat source in spaced relation thereto and providing an annular fluid passage for flow of propellant over said heat source;
   said housing having a propellant inlet to one end of said passage;
   said housing including an outer radiation shield, said radiation shield comprising a plurality of sections movable from a closed to an open position and thermostatic means responsive to temperature changes within said housing for moving said sections to thereby maintain a predetermined operating temperature by permitting radiation directly from the inner portion of said housing adjacent said heat source, and
   a nozzle receiving the heated propellant from the outlet end of said passage.

8. A direct cycle radioisotope-heated propellant, thrustor comprising:
   a radioisotope heat source;
   a housing surrounding said heat source in spaced relation thereto and providing an annular fluid passage for flow of propellant over said heat source;
   said housing having a propellant inlet to one end of said passage;
   said housing including an outer radiation shield, said radiation shield comprising a plurality of movable clam shell sections;
   means for moving said sections from an open to a closed position to maintain a safe operating temperature by permitting radiation directly from the inner portion of said housing adjacent said heat source, and
   a nozzle receiving the heated propellant from the outlet end of said passage.

9. A direct cycle radioisotope-heated propellant, thrustor comprising:
   a radioisotope heat source;
   a housing surrounding said heat source in spaced relation thereto and providing an annular fluid passage for flow of propellant over said heat source;
   said housing having a propellant inlet to one end of said passage;

said housing including an outer radiation shield, said radiation shield comprising a plurality of movable louver sections and means for moving said sections from a closed to an open position to maintain a safe operating temperature by permitting radiation directly from the inner portion of said housing adjacent said heat source, and a nozzle receiving the heated propellant from the outlet end of said passage.

No references cited.

CARLTON R. CROYLE, *Primary Examiner.*

MARK M. NEWMAN, *Examiner.*